United States Patent [19]

Kikuchi et al.

[11] Patent Number: 5,327,314
[45] Date of Patent: Jul. 5, 1994

[54] DISK CARTRIDGE LIFTER WITH CUTOUT ACROSS FOLDING LINE

[75] Inventors: Shuichi Kikuchi; Kiyoyuki Miyata, both of Miyagi, Japan

[73] Assignee: Sony Corporation, Japan

[21] Appl. No.: 934,244

[22] Filed: Aug. 25, 1992

[30] Foreign Application Priority Data

Aug. 30, 1991 [JP] Japan .................. 3-220264

[51] Int. Cl.⁵ .................. G11B 23/03; G11B 3/00
[52] U.S. Cl. .................. 360/133; 369/291
[58] Field of Search .................. 369/72, 291; 206/444; 360/133, 137

[56] References Cited

U.S. PATENT DOCUMENTS

| | | | |
|---|---|---|---|
| 4,510,546 | 4/1985 | Asami et al. .................. | 360/133 |
| 4,639,967 | 2/1987 | Bordignon .................. | 360/137 X |
| 4,677,517 | 6/1987 | Gelardi et al. .................. | 360/133 |
| 4,739,433 | 4/1988 | Oishi .................. | 360/133 |
| 4,809,114 | 2/1989 | Seto .................. | 360/133 |
| 4,979,065 | 12/1990 | Ikebe et al. .................. | 360/133 |
| 5,083,231 | 1/1992 | Veenstra et al. . | |

FOREIGN PATENT DOCUMENTS

| | | | |
|---|---|---|---|
| 0202997 | 11/1986 | European Pat. Off. . | |
| 9109937 | 2/1992 | Fed. Rep. of Germany . | |
| 61-280085 | 12/1986 | Japan .................. | 360/133 B |
| 62-9578 | 1/1987 | Japan .................. | 206/444 |
| 62-40681 | 2/1987 | Japan .................. | 369/72 |
| 3-113884 | 5/1991 | Japan .................. | 206/444 |
| 3-192587 | 8/1991 | Japan .................. | 369/72 |
| 2100048 | 12/1982 | United Kingdom . | |

OTHER PUBLICATIONS

Japanese Abstract, JP2193378, Jul. 31, 1990, Kawamura Koichi.
Japanese Abstract, JP3192587, Aug. 22, 1991, Kinoshita Katsuyoshi.

Primary Examiner—Edward K. Look
Assistant Examiner—John Ryznic
Attorney, Agent, or Firm—Ronald P. Kananen

[57] ABSTRACT

A lifter for a disk mounted in a disk cartridge comprises a lifter body formed of a flexible thin plate material and having a fold, folded at a predetermined angle so as to define a fixing member at one side of the fold and a pressing member at the other. A cutout is formed at a position across the fold to minimize distorting forces concentrated at the fold.

17 Claims, 6 Drawing Sheets

DISK CARTRIDGE LIFTER WITH CUTOUT ACROSS FOLDING LINE

BACKGROUND OF THE INVENTION

1. Field of the Invention

The present invention relates generally to a lifter for disk cartridges, such as floppy disks, installed in electronic devices. Particularly, the invention relates to a lifter having a plate spring construction defining a cleaning device for a disk cartridge.

2. Description of the Prior Art

Conventional lifters for a disk cartridge have been disclosed, for example, in U.S. Pat. No. 4,510,546 which describes a structure of a conventional 3.5 inch floppy disk. A structure of a conventional disk lifter will be described hereinbelow with reference to the drawings. A lifter for a disk cartridge is generally faced with a rib to cover a whole area of an effective recording width of the disk. The lifter associates with the rib to lightly press a liner toward the disk surface, dust adhered on the disk surface being wiped off thereby. Referring to FIG. 6, the lifter 101 is composed of a thin plate substrate punched out from sheet stainless steel, for example, so as to have a predetermined configuration. The substrate is folded, or bent, at a predetermined folding angle $\theta$ along a predetermined fold line 102 to define a fixing member 103 at one side of the fold line 102, for being fixed to an inner surface of the disk cartridge, and a pressing members 104 at the other side of the fold line 102 extending opposite the fixing member 103 for applying lifting pressure to a disk (not shown). When the fixing member 103 is fixed to the inner surface of the cartridge case, the liner is lightly pressed to the disk surface by means of spring force generated by the pressing member 104 extended from the fixing member 103 at the predetermined folding angle $\theta$.

However, such conventional lifters for disk cartridges, i.e., formed by punching from thin plate stainless steel to a predetermined configuration and being folded at the predetermined angle $\theta$, present several drawbacks. First, referring again to FIG. 6, pressure applied to the pressing member 104 of the lifter 101 was measured by a pressure sensor 106 at each of six locations (a to f) at distances of 2 m, 7 mm, and 12 mm from the edge of the pressing member for each location. The results of measurement are shown in FIG. 7. As seen in FIG. 7, pressure applied by the lifter fluctuates at each measuring point. Thus, uniform pressure cannot be applied to the disk via the lifter over the whole of the recording track.

Further, a disk cartridge case is comprised of an upper shell and a lower shell, usually formed by injection molding of synthetic resin. A clearance is present within tile cartridge case for accommodating the disk. The size of the clearance depends on the die for molding the casing shells and other molding conditions. The size of the clearance however, affects tile amount of pressure the lifter is able to apply to the disk. Also, clearance variation within tile disk cartridge may occur causing pressure applied by the lifter to vary according to rotation of the disk which further prevents uniform pressure from being applied by the lifter.

FIG. 8 shows measurements taken along the locations a to f at a distance of 7 mm from the edge of the pressing member, under a condition where clearance variation is present in a disk cartridge. As can be seen from the graph, pressure applied by the lifter is difficult to control because tile pressure is greatly varied an becomes unstable when the clearance variation is great.

In order to solve the aforementioned problems, the inventors of the present invention have studied the causes of such problems. FIG. 9 shows a perspective view of the convention lifter, the pressing member 104 of the lifter 101 is bent as shown in FIG. 9, this causes pressure applied thereby to become unstable and gives rise to the above-described problems.

Generally, when a metallic plate is rolled to a thin plate, 'curly bend' is generated on the obtained thin plate 107 as shown in FIG. 10. If a lifter is punched from such thin metallic plate 107, bend is present in the surface of the lifter. In addition, when the lifter 101 is formed by folding angle $\theta$ and the fixing member 108 of the lifter 101 is flattened and fixed to the inner surface of the cartridge case (not shown), distortion generated between the pressing member 104 having a bend in the surface and the fixing member 103 having a flat surface fixed to the cartridge casing becomes concentrated at the fold line 102 which can cause further distortion of the pressing member 104.

Although such bending as shown in FIG. 10 can be straightened to some extent by passing the thin metallic plate 107 through a straightening device, commonly called a leveler, curly bend in the plate surface, caused generally by winding of the plate into rolls during manufacture, as shown in FIG. 11, cannot be easily, or completely removed by such technique.

SUMMARY OF THE INVENTION

It is therefore a principal object of the present invention to overcome the drawbacks of the prior art.

It is a further object of the invention to provide a lifter in which bend present in a pressing member thereof is straightened for allowing substantially even pressure to be applied to a disk.

In order to accomplish the aforementioned and other objects, a lifter for a disk mounted in a disk cartridge is provided, comprising: a lifter body being formed of a flexible thin plate material and having a fold, folded at a predetermined folding angle to define a fixing member extending at one side of the fold to an edge of the lifter body and a pressing member extending from another side of the fold opposite the fixing member, a cutout further being formed at a position across the fold.

According to another aspect of the invention a method for forming a lifter for a disk mounted in a disk cartridge is provided, comprising: punching a lifter body from a flexible thin plate material; folding the plate material at a predetermined folding angle to form a fold so as to define a fixing member extending at one side of the fold to an edge of tile lifter body and a pressing member extending from another side of the fold opposite the fixing member; forming a cutout further at a position across the fold.

DESCRIPTION OF THE PREFERRED EMBODIMENT

Figure 1:
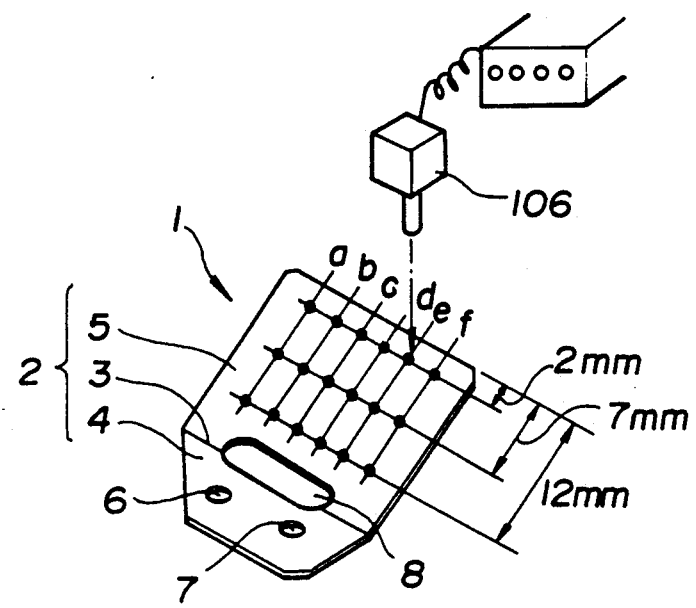
FIG. 1 is a perspective view of a lifter according to the invention.

Referring now to the drawings, particularly to FIG. 1, a perspective view of a lifter 1 according to the invention is shown. The lifter 1 is composed of a thin flexible plate material folded at a predetermined folding angle $\theta$. The lifter is divided into two portions with respect to a fold 3 at which it is folded. That is, a fixing member 4 extending from the fold 3 at one side thereof to an edge of the lifter 1, and a pressing member 5 extending from the fold 3 to an edge of the lifter 1 in a direction opposite the fixing member 4. A cut-out 8 is formed at a position across the fold 3.

Figure 2:
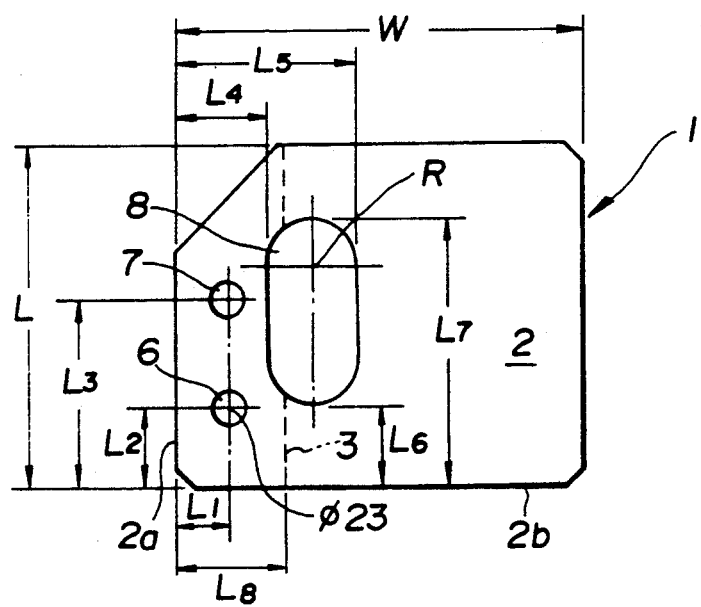
FIG. 2 is a plan view of the lifter according to the invention.

FIG. 2 shows a detailed plan view of the lifter 1 according to the invention. According to one embodiment of a lifter 1 according to the invention, the lifter 1 may be punched from thin stainless steel plate 2 (SUS304CS-H for example) having a thickness of 0.05 mm. The plate 2 is punched to a rectangular configuration having 26 mm of width W and 22 mm of length L. Two round holes 6 and 7 having a diameter of 2.3 mm, for example, are defined in the plate 2 at a position such that the center of the hole 6, is a distance L2 (e.g. 3.25 mm) from a lower edge 2b and a distance L1 (3.25 mm) from a side edge 2a of the plate 2. A center of the hole 7 is a distance L3 (7 mm) from the lower edge 2b and a distance L1 from the side edge 2a. Further a cut-out is formed between distances L4 (6 mm) and L5 (12 mm) from the side edge 2a. Ends of the cut-out are formed between distances L6 (5 mm) and L7 (17 mm) from the lower edge 2b.

The cut-out portion has an elliptical configuration consisting of a longitudinal cutout having semicircular ends with radii R (3 mm). The outermost edges of the semicircular ends correspond to the distances L6 and L7 as noted above. The lifter is constructed by folding the plate 2 at the predetermined folding angle along the fold 3, which is defined at a distance L8 (7 mm) from the side edge 2a and parallel therewith. Thus the fixing member 4 is defined to the left of the fold 3 (in FIG. 2) and the pressing member 5 is defined to the right.

The lifter is then positioned in a disk cartridge (not shown) by engaging the holes 6 and 7 of the fixing member 4 with corresponding cylindrical projections formed on an interior surface of the cartridge casing and attaching thereon by appropriate technique (i.e. ultrasonic deposition, adhesives, etc.) for suitable positioning the lifter 1 on the inner surface of the cartridge case (not shown).

Figure 3:
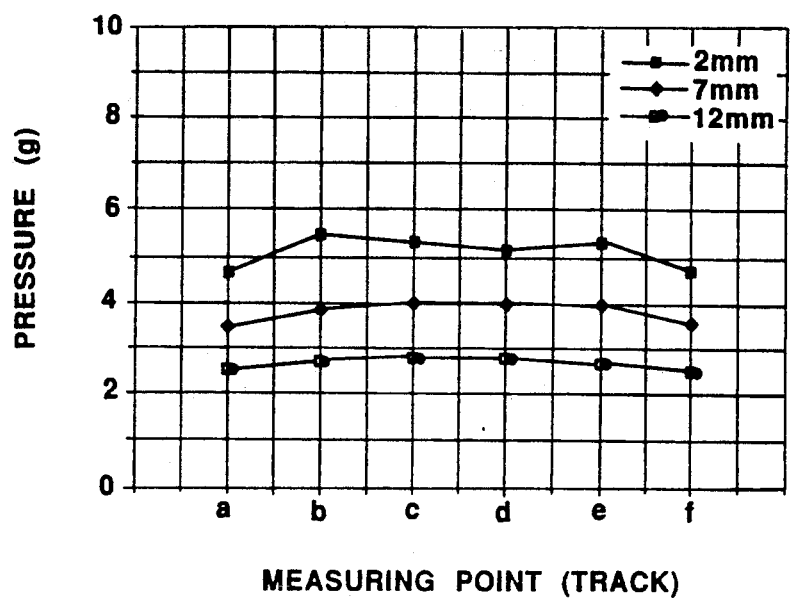
FIG. 3 is a graph showing pressure variation characteristics applied to the lifter as measured at a plurality of measuring points under a condition wherein a clearance in a cartridge casing is maintained constant.
Figure 4:
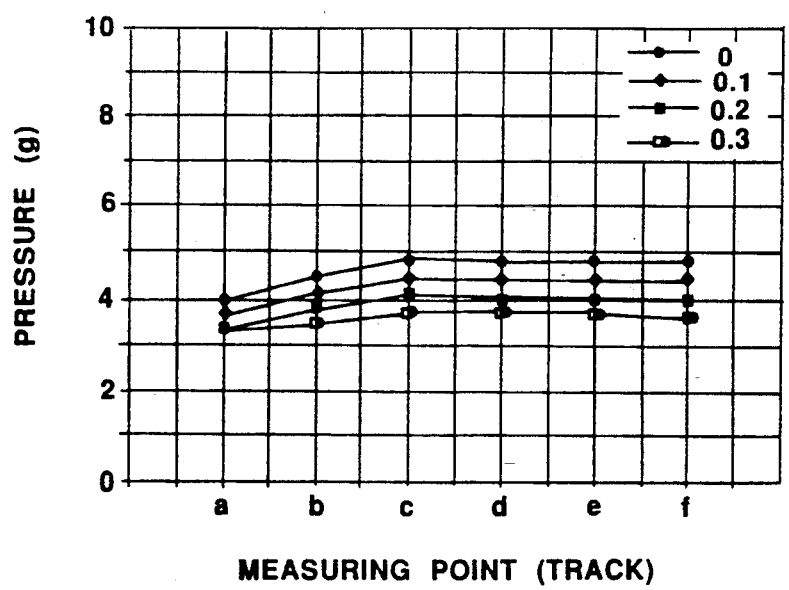
FIG. 4 is a graph showing pressure variation characteristics applied to the lifter as measured at a plurality of measuring points under a condition wherein a clearance in a cartridge casing is varied.
Figure 7:
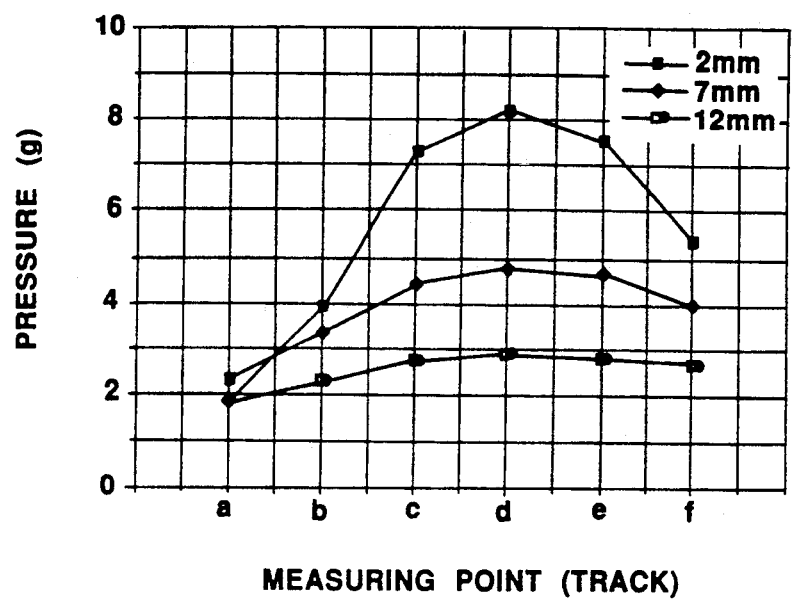
FIG. 7 is a graph showing pressure variation characteristics applied to a conventional lifter as measured at a plurality of measuring points under a condition wherein a clearance in a cartridge casing is maintained constant.
Figure 8:
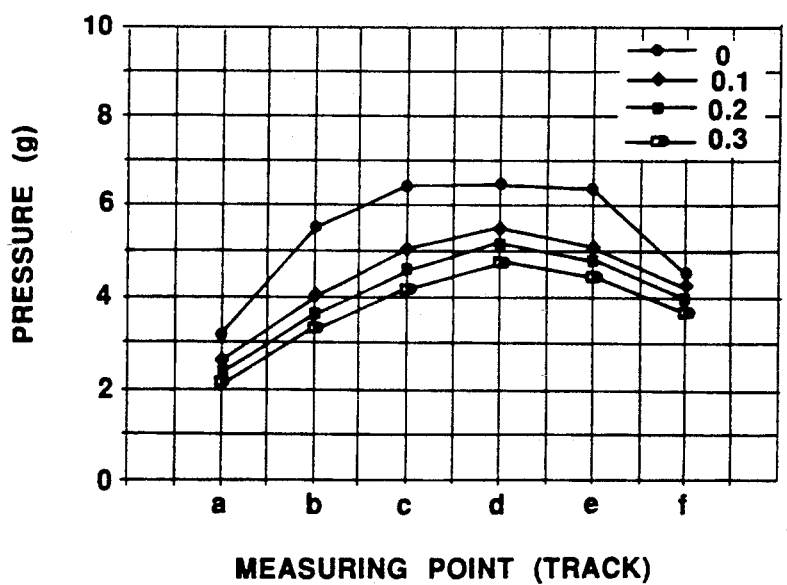
FIG. 8 is a graph showing pressure variation characteristics applied to the conventional lifter as measured at a plurality of measuring points under a condition wherein a clearance in a cartridge casing is varied.
Figure 9:
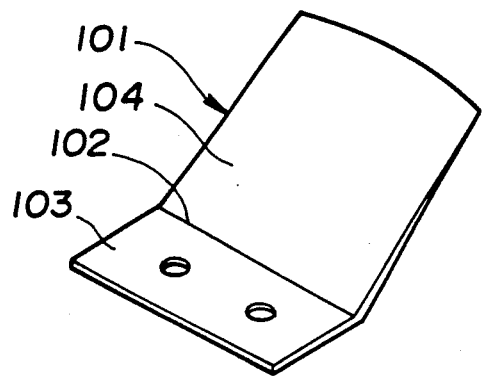
FIG. 9 is a perspective view of a conventional lifter showing disadvantages thereof.
Figure 10:
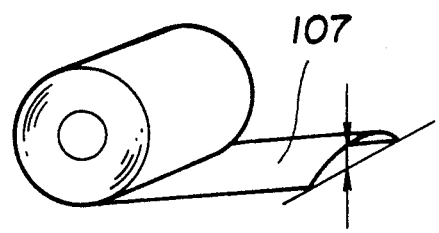
FIG. 10 is a perspective view of thin metallic plate showing curl bend generated thereon in the width direction due to rolling or such technique applied to the plate.
Figure 11:
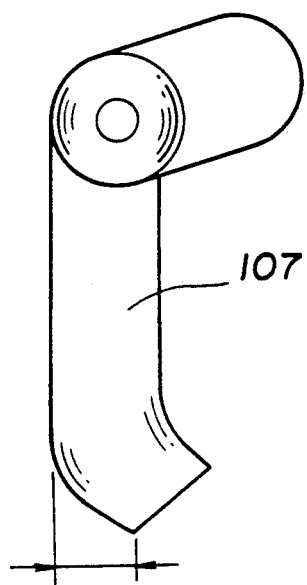
FIG. 11 is a perspective view of thin metallic plate showing curl bend generated thereon in a lengthwise direction.
Figure 12:
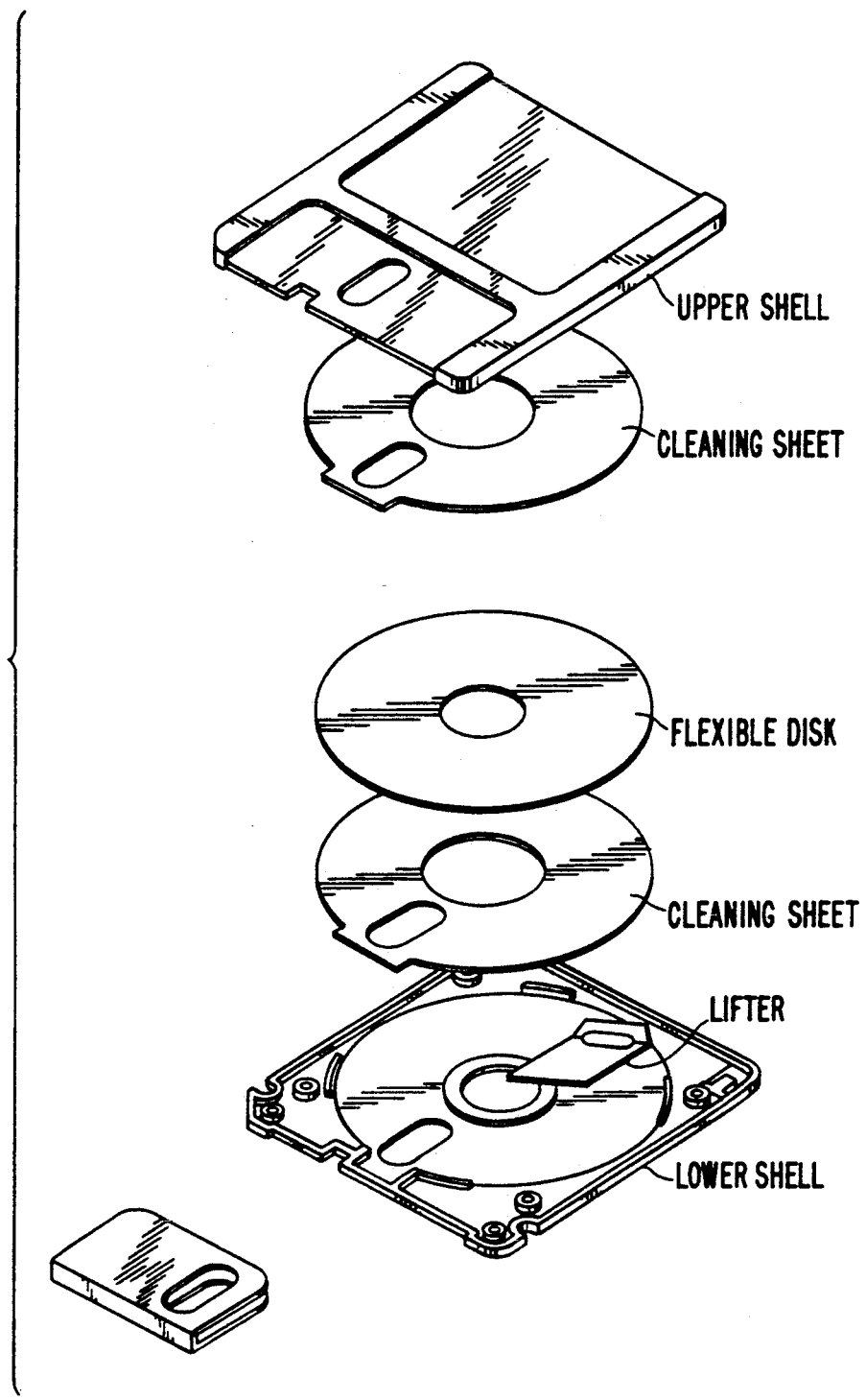
FIG. 12 is an exploded view showing the disposition of a lifter according to the present invention disposed in the lower half of a disk cartridge along with a flexible disk and associated cleaning sheets.

The above-described lifter 1 was subjected to pressure measurement testing similarly to that shown in FIGS. 7 and 8 for the conventional lifter. FIG. 3 shows the results of pressure testing at locations a to f at distances of 2 mm, 7 mm, and 12 mm from the edge of the pressing member for each location respectively. Also pressure was measured under a condition in which a clearance within a cartridge casing is varied at locations a to f at a distance of 7 mm from the edge of the pressing member 5. As can be seen, pressure variation of the lifter of the invention relative a disk is in a much smaller range than that of the conventional lifter as shown in FIGS. 7 and 8. Therefore, according to the invention, substantially uniform pressure can be applied by the lifter over the whole area of the record track of the disk.

In addition, pressure is comparatively stabilized even when clearance variation is present within the cartridge case. Therefore, a large pressure variation cannot occur and unstable pressure cannot be applied to the disk. Thus pressure application by the lifter can easily be controlled.

Figure 5:
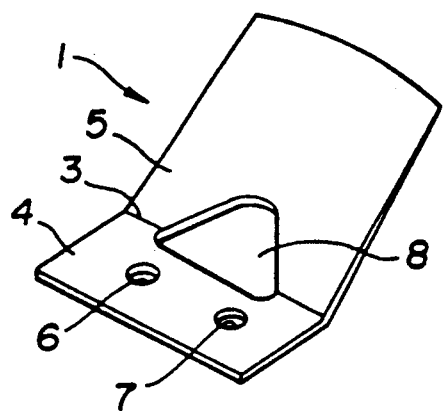
FIG. 5 is a perspective view of a second embodiment of a lifter according to the invention.
Figure 6:
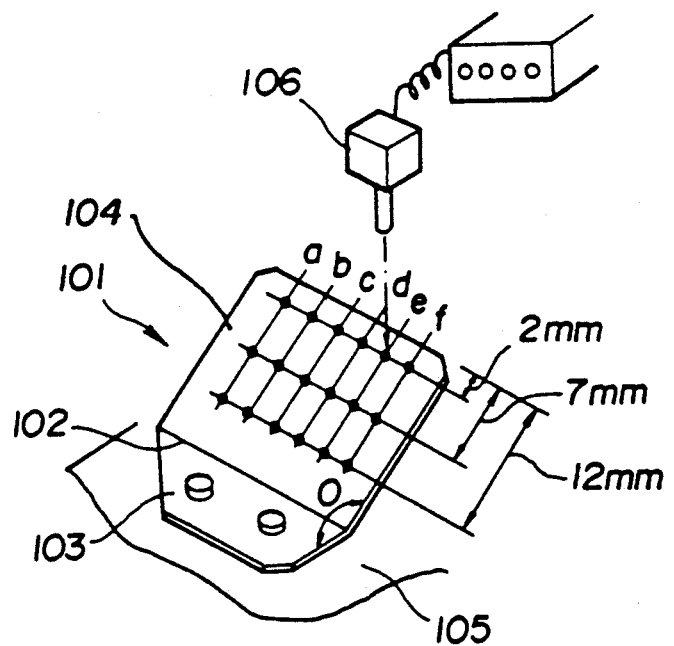
FIG. 6 is a perspective view of a conventional lifter.

FIG. 5 shows a second embodiment of a lifter according to the invention. The second embodiment is substantially similar in construction to the above-described first embodiment with the exception that the cut-out portion 8 has a triangular formation. According to this, a cantilever effect of the lifter 1 can be restricted. Therefore, pressure application can be stabilized even if slight distortion, such as curly bending is present in the plate material.

Further, appropriate alteration of size, configuration and number of cutout portions 8 may be made corresponding to the extent of bend of the lifter 1.

Also, it will be noted that, although stainless steel plate has been used as an example of a plate material in the above-described embodiments, plastic, synthetic resin, or other material may also be suitably employed in a lifter according to the invention.

According to the invention a cut-out portion is defined at a position being across a fold which forms a boundary between the fixing member and the pressing member of the lifter and thus the above-described advantages may be obtained.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A lifter for a disk mounted in a disk cartridge comprising:

an essentially flat single thickness thin plate;

a cutout of predetermined shape formed in said flat thin plate; and means defining a fold which extends across said flat thin plate and through said cutout and which separates a base member which is fixed to said disk cartridge and a pressing member which extends from said base member at a predetermined angle.

2. A lifter for a disk mounted in a disk cartridge comprising:

a thin plate member having a base portion adapted for connection to said disk cartridge and a pressing portion which extends a predetermined angle with respect to said base member; and a cutout of predetermined shape formed partly in said base member and partly in said pressing portion and located so as a fold line which separates said base portion from said pressing portion passes through said cutout.

3. A lifter for a disk mounted in a disk cartridge comprising:

a base portion adapted for connection to said disk cartridge;

a pressing portion which is integral with base member and which extends a predetermined angle with respect to said base member; and means for unifying the pressure applied by said pressing portion comprising a cutout of predetermined shape formed partly in said base member and partly in said pressing portion and located so that a fold line which separates said base portion from said pressing portion passes through said cutout.

4. A lifter for a disk mounted in a disk cartridge comprising:

a lifter body being formed of a flexible thin plate material and having a fold, folded at a predetermined folding angle to define a fixing member extending at one side of said fold to an edge of said lifter body and a pressing member extending from another side of said fold opposite said fixing member, a cutout further being formed at a position across said fold.

5. A lifter as set forth in claim 4, wherein said thin plate material is of synthetic resin.

6. A lifter as set forth in claim 4, wherein said thin plate material is metallic.

7. A lifter as set forth in claim 6, wherein said thin metallic plate material is stainless steel.

8. A lifter as set forth in claim 4, wherein said cutout is elliptical in shape.

9. A lifter as set forth in claim 4, wherein said cutout is triangular in shape.

10. A lifter as set forth in claim 4, wherein said fixing member has at least one circular hole defined therein.

11. A lifter as set forth in claim 7, wherein said stainless steel plate material has a thickness of 0.05 mm.

12. A lifter as set forth in claim 4 wherein said fixing member is attached to an inner surface of a disk cartridge casing and said pressing member applies pressure to a cleaning sheet interposed between the pressing member and a rotatably mounted disk.

13. A method for forming a lifter for a disk mounted in a disk cartridge comprising:

punching a lifter body from a flexible thin plate material;

folding said plate material at a predetermined folding angle to form a fold so as to define a fixing member extending at one side of said fold to an edge of said lifter body and a pressing member extending from another side of said fold opposite said fixing member; and forming a cutout further at a position across said fold.

14. A method as set forth in claim 13, wherein said cut-out is elliptic in shape.

15. A method as set forth in claim 13, wherein said cut-out is triangular in shape.

16. A disk cartridge, comprising:

upper and lower shells attached to form a cartridge casing having a clearance therewithin between said upper and lower shells;

a flexible disk rotatably mounted in said clearance;

a cleaning sheet interposed between said flexible disk and said cartridge casing;

a lifter arranged between said cartridge casing and said cleaning sheet and comprising a lifter body being formed of a flexible thin plate material and having a fold, folded at a predetermined folding angle to define a fixing member extending at one side of said fold to an edge of said lifter body and attached to an inner surface of said cartridge casing and, a pressing member extending from another side of said fold opposite said fixing member, said pressing member applying pressure to said cleaning sheet, a cutout further being formed in said lifter at a position across said fold.

17. A disk cartridge as set forth in claim 16, wherein a cleaning sheet and a lifter are arranged on each side of said flexible disk.

* * * * *